United States Patent [19]
Kanaya et al.

[11] Patent Number: 5,944,479
[45] Date of Patent: Aug. 31, 1999

[54] STACKING APPARATUS

[75] Inventors: Kunio Kanaya, Tajimi; Takayoshi Kojima; Masao Kuwano, both of Kakamigahara, all of Japan

[73] Assignee: Ohkuma Corporation, Aichi-ken, Japan

[21] Appl. No.: 08/953,860

[22] Filed: Oct. 16, 1997

[30] Foreign Application Priority Data

Oct. 17, 1996 [JP] Japan .................................. 8-275022

[51] Int. Cl.$^6$ ........................... B65G 61/00; B65G 57/22
[52] U.S. Cl. .................................. 414/791.6; 414/792.8; 414/902; 198/431; 198/468.2
[58] Field of Search ............................ 414/791.6, 792.8, 414/794.3, 799, 791.8, 902, 922; 198/431, 468.2

[56] References Cited

U.S. PATENT DOCUMENTS

| | | | |
|---|---|---|---|
| 2,883,074 | 4/1959 | Boehl et al. | 414/902 |
| 3,643,822 | 2/1972 | Birchall | 414/791.6 |
| 3,833,132 | 9/1974 | Alduk | 414/794.3 |
| 4,108,061 | 8/1978 | Bowser | 414/791.6 |
| 4,311,425 | 1/1982 | Pulda | 414/791.6 |
| 4,898,511 | 2/1990 | Rossig et al. | 414/794.3 |
| 5,567,113 | 10/1996 | Mumper | 414/791.6 |
| 5,656,005 | 8/1997 | Cummings et al. | 414/902 |

FOREIGN PATENT DOCUMENTS

| | | | |
|---|---|---|---|
| 1495482 | 9/1967 | France | 414/791.6 |
| 3814101 | 11/1988 | Germany | 414/902 |
| 7-157085 | 6/1995 | Japan . | |

*Primary Examiner*—James W. Keenan
*Assistant Examiner*—Douglas Hess
*Attorney, Agent, or Firm*—Lahive & Cockfield, LLP

[57] ABSTRACT

A palletizer comprises a lifting mechanism (1) and a stacking mechanism (2) including a carriage (28), a roller conveyer (33), an upper plate (39), a lower plate (40), and an abutment plate (53). The palletizer further comprises a moving table assembly (3) including a table (64) and a control unit (4). The lifting mechanism (1) vertically transfers a plurality of loads (W) delivered by an external conveyer (6). Then, the roller conveyer (33) of the stacking mechanism (2) horizontally transfers the loads (W) received from the lifting mechanism (1) onto the lower plate (40) in front of pallet (P), where the upper plate (39) and the abutment plate (53) hold a first load (W) therebetween and slide it over to a point over the stacking position. Then, the lower plate (40) is pulled out from under load (W) to place it on the pallet (P). In the same manner, the next load (W) is placed on the pallet (P) in front of the first load (W). This stacking operation is repeated until the first tier of loads (W) are fully stacked thereon. Thereafter, the carriage (28) is raised to position the roller conveyer (33), the upper plate (39), the lower plate (40), and the abutment plate (53) at the next stacking level to stack another tier of loads (W) on top of the first tier of loads (W) already stacked. This stacking procedure is repeated until pallet (P) is fully stacked with a desired number of tiers.

20 Claims, 16 Drawing Sheets

(ODD NUMBER TIER)  (EVEN NUMBER TIER)

Fig 13B
(ODD NUMBER TIER)  (EVEN NUMBER TIER)

(ODD NUMBER TIER)  (EVEN NUMBER TIER)

Fig 13D
(ODD NUMBER TIER)  (EVEN NUMBER TIER)

(ODD NUMBER TIER)  (EVEN NUMBER TIER)

Fig 13F

STACKING APPARATUS

BACKGROUND OF THE INVENTION

1. Field of the Invention

The present invention relates to a stacking apparatus for stacking a plurality of boxes, bags, and/or other types loads on top of each other on a platform, such as a pallet, a basket cart, and the like.

2. Description of the Related Art

FIG. 18 shows a conventional stacking apparatus known as a palletizer including an articulated robot 101 which in turn includes a manipulator 102 and an arm 103. In operation, as the manipulator 102 hoists load W, the arm 103 stretches and bends itself so as to locate the manipulator 102 in a stacking position, whereupon load W is released by the manipulator 102. This process is repeated to stack a plurality of loads.

However, the above-described palletizer has suffered several disadvantages. For example, when stacking different types of loads, such as corrugated cartons and plastic cases on a single pallet, the operation must be interrupted to manually adjust or change the manipulator every time the type of load is changed, so that the stacking operation cannot be fully automated.

In addition, when loads are stacked on a basket cart with vertical walls provided around its edges, the vertical walls tends to interfere with the manipulator, making it difficult to stack loads close to the walls, with wasted, empty space created in the cart. Thus, there has been a long-felt need for an improved palletizer that overcomes the above-identified problems.

SUMMARY OF THE INVENTION

An object of the present invention is to provide an improved stacking apparatus that can stack different types of loads continuously and automatically without necessitating any interruption or intervention by the operator.

Another object of the present invention is to provide an improved stacking apparatus that can efficiently utilize the stacking space of a basket cart without creating dead space therein.

The above objects and other related objects are realized by providing an improved stacking apparatus for sequentially stacking loads on a platform in tiers. The stacking apparatus comprises: a vertical transfer means for vertically transferring an externally provided load according to a stacking level; a horizontal transfer means for receiving the load from the vertical transfer means and approximately horizontally transferring the load to a point close to the platform; and a stacking means for receiving the load from the horizontal transfer means and horizontally transferring the load to the point directly over a stacking position on the platform and placing the load in the stacking position. The stacking apparatus further comprises: a vertical positioning means for vertically positioning the horizontal transfer means and the stacking means corresponding to the stacking level; a horizontal positioning means for positioning the platform on a horizontal plane in a direction orthogonal to the direction in which the stacking means transfers the load to the point directly over the stacking position; and control means for controlling the operation of these elements in synchronism.

According to one aspect of the present invention, the stacking means includes: a lower plate disposed below the horizontal transfer means for being transferred horizontally to the point over the stacking position with the load carried thereon; an upper plate disposed between the lower plate and the horizontal transfer means for pushing the load on the lower plate to the point directly over the stacking position; and an abutment plate for interposing the load between itself and the upper plate, wherein the lower plate is pulled out from under the load at the point directly over the stacking position so as to place the load in the stacking position on the platform.

According to another aspect of the present invention, the upper plate is disposed horizontally such that an edge of the upper plate abuts on the load when the load is interposed between the upper plate and the abutment plate whereas the abutment plate is disposed substantially vertically such that the load abuts on the side surface of the abutment plate on the upper plate side when interposed between the upper plate and the abutment plate.

According to still another aspect of the present invention, the abutment plate is vertically movable between upper and lower positions such that, in the lower position, the abutment plate can engage the load to interpose the load between the upper plate and the side surface of the abutment plate, whereas in the upper position, the abutment plate is disengaged from and clears the load.

According to yet another aspect of the present invention, the side surface on which the load abuts functions as a load guide while the load is being placed on the platform so as to allow the load to be accurately placed in the stacking position.

In accordance with another aspect of the present invention, the abutment plate is movable at the same speed in the same horizontal direction as the upper plate.

Preferably, the thickness of the abutment plate is significantly less than the depth of the load, such that when a plurality of loads are stacked on the platform, only a small clearance is left between adjacent loads, thus efficiently using the surface of the platform on which the load is placed.

In one practice, the abutment plate has a thickness of about 6 mm.

In another practice, the thickness of each of the upper and lower plates is significantly less than the height of the load, such that the load is gently placed on the platform when the lower plate is pulled out from under the load.

In another preferred mode of the present invention, the upper and lower plates are both narrower than the load to be stacked on the platform. In this way, a plurality of loads can be stacked with a minimum clearance therebetween and that neither the upper nor the lower plate interferes with adjacent loads that have been already stacked.

In carrying out the invention in one preferred mode, the vertical transfer means comprises: a vertically movable roller conveyer for receiving the load at a first end thereof and sending off the load at a second end thereof; a drive unit for lifting and lowering the roller conveyer; and a pair of stoppers provided adjacent to the first and second ends. The stoppers can rise above the upper surface of the roller conveyer, thus preventing the load from falling from the conveyer while the roller conveyer is in operation.

In accordance with one aspect of the present invention, the horizontal positioning means is a moving table assembly driven by a motor.

In accordance with one aspect of the present invention, the moving table assembly is a roller conveyer provided with a drive unit to automatically carry away the platform once the loading operation is completed.

In accordance with one aspect of the present invention, the horizontal transfer means includes a roller conveyer for carrying the load thereon, the roller conveyer having a horizontal section and a ramp for bringing the load from the horizontal section down to the stacking means.

In accordance with one aspect of the present invention, the horizontal transfer means further includes a plurality of stoppers that can be raised above the upper surface of the roller conveyer for separating a plurality of loads on the roller conveyer.

BRIEF DESCRIPTION OF THE DRAWINGS

For a fuller understanding of the nature and objects of the present invention, reference should be made to the following detailed description and the accompanying drawings, in which:

FIGS. 13A–13F show examples of stack patterns executable by the palletizer of FIG. 1;

DETAILED DESCRIPTION OF THE PREFERRED EMBODIMENTS

A preferred embodiment of the present invention is described hereinafter with reference to the attached drawings.

Figure 1:
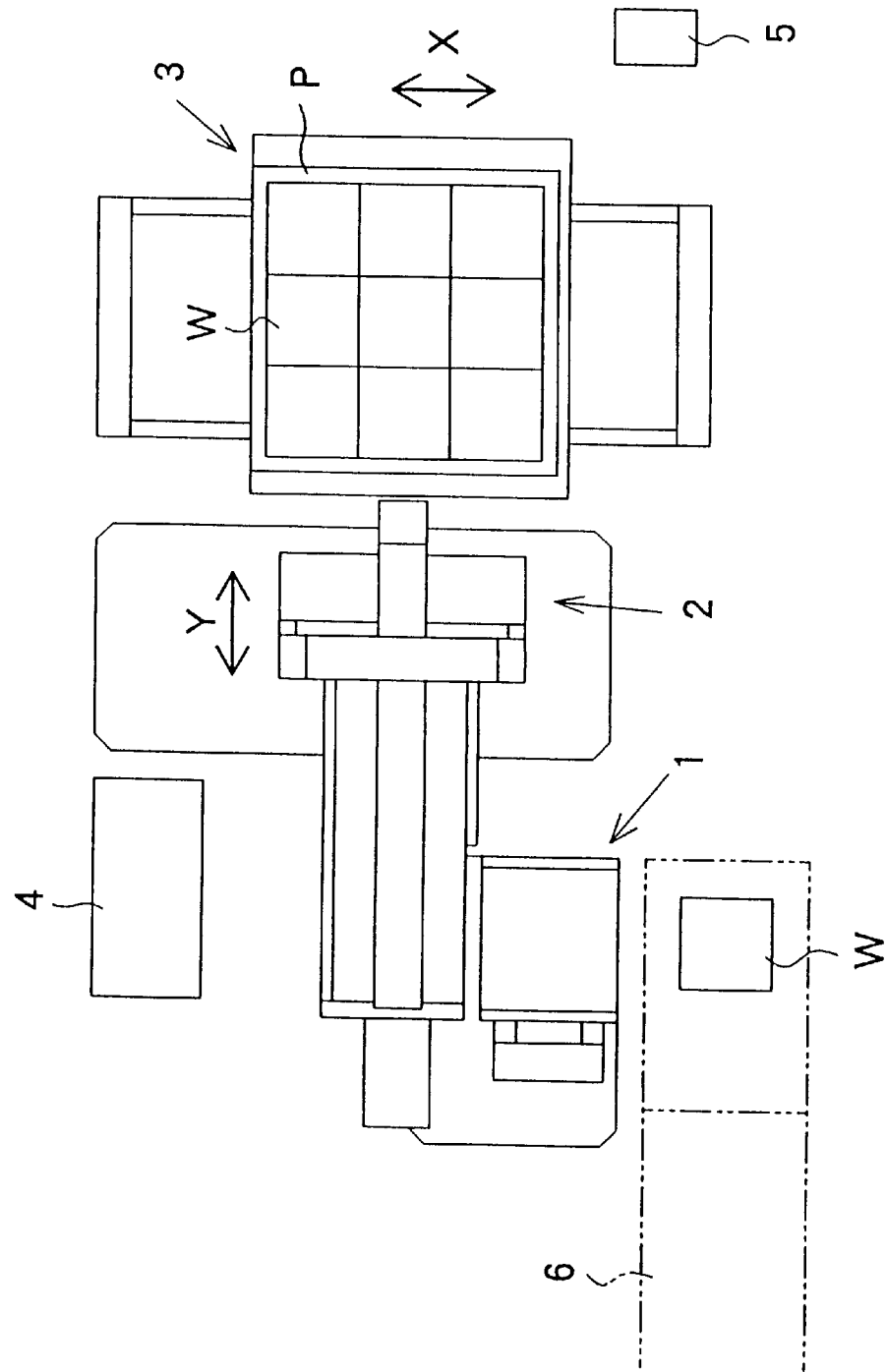
FIG. 1 is a plan view of a palletizer of an embodiment in accordance with the present invention used in combination with an external conveyer 6, shown in double-dot-and-dash lines, which does not constitute part of the palletizer.

FIG. 1 shows a plan view of a palletizer that embodies the present invention. The palletizer includes a lifting mechanism 1, a stacking mechanism 2, a moving table assembly 3, a control unit 4, and a control panel 5. In brief, the lifting mechanism 1 vertically transfers a plurality of loads W delivered by an external conveyer 6 which does not constitute part of the palletizer. The stacking mechanism 2 then horizontally transfers loads W received from the lifting mechanism 1 and stacks them on pallet P of the moving table assembly 3.

Figure 2:
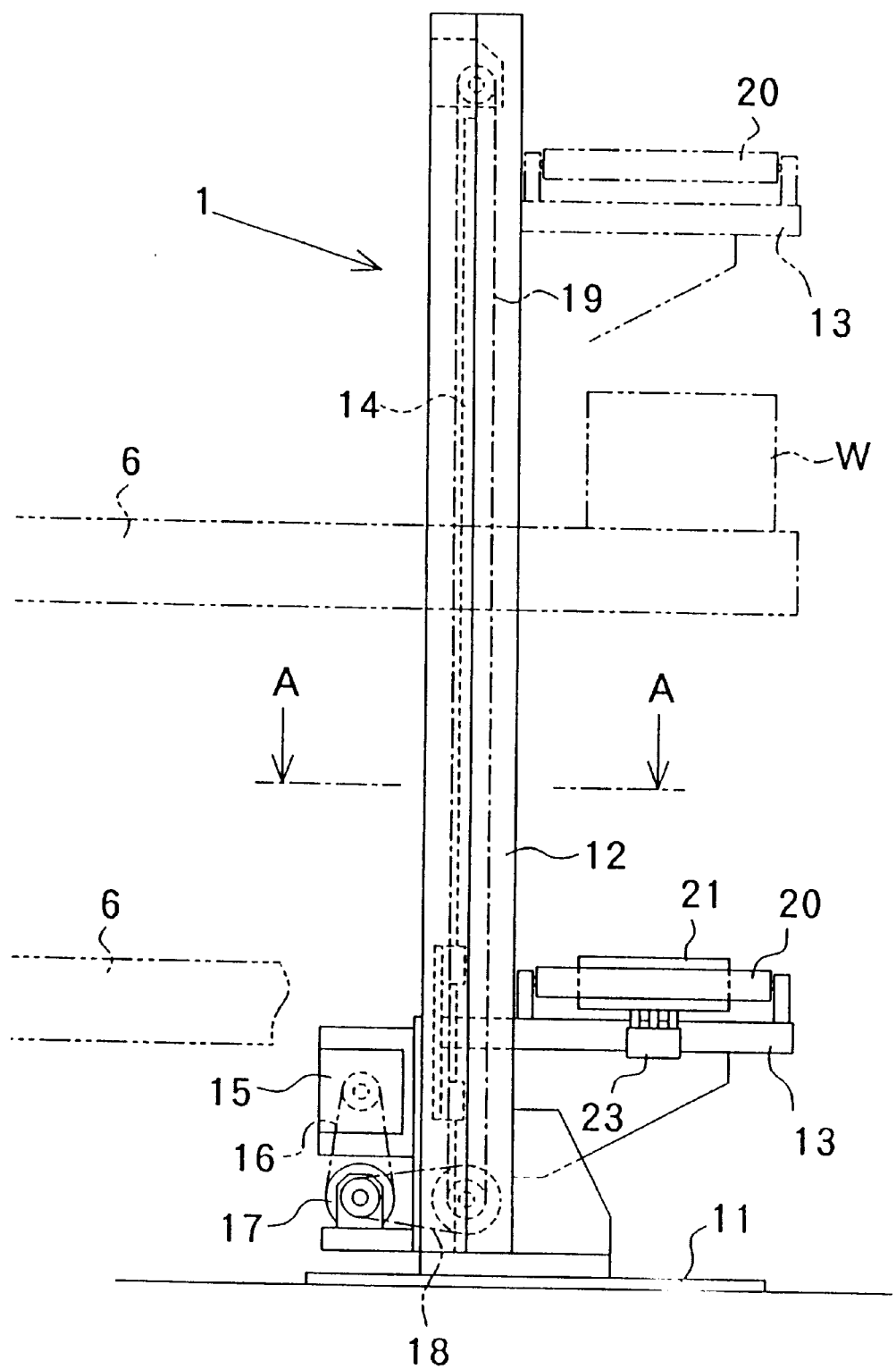
FIG. 2 is an elevation view of the lifting mechanism of the palletizer of FIG. 1.
Figure 3:
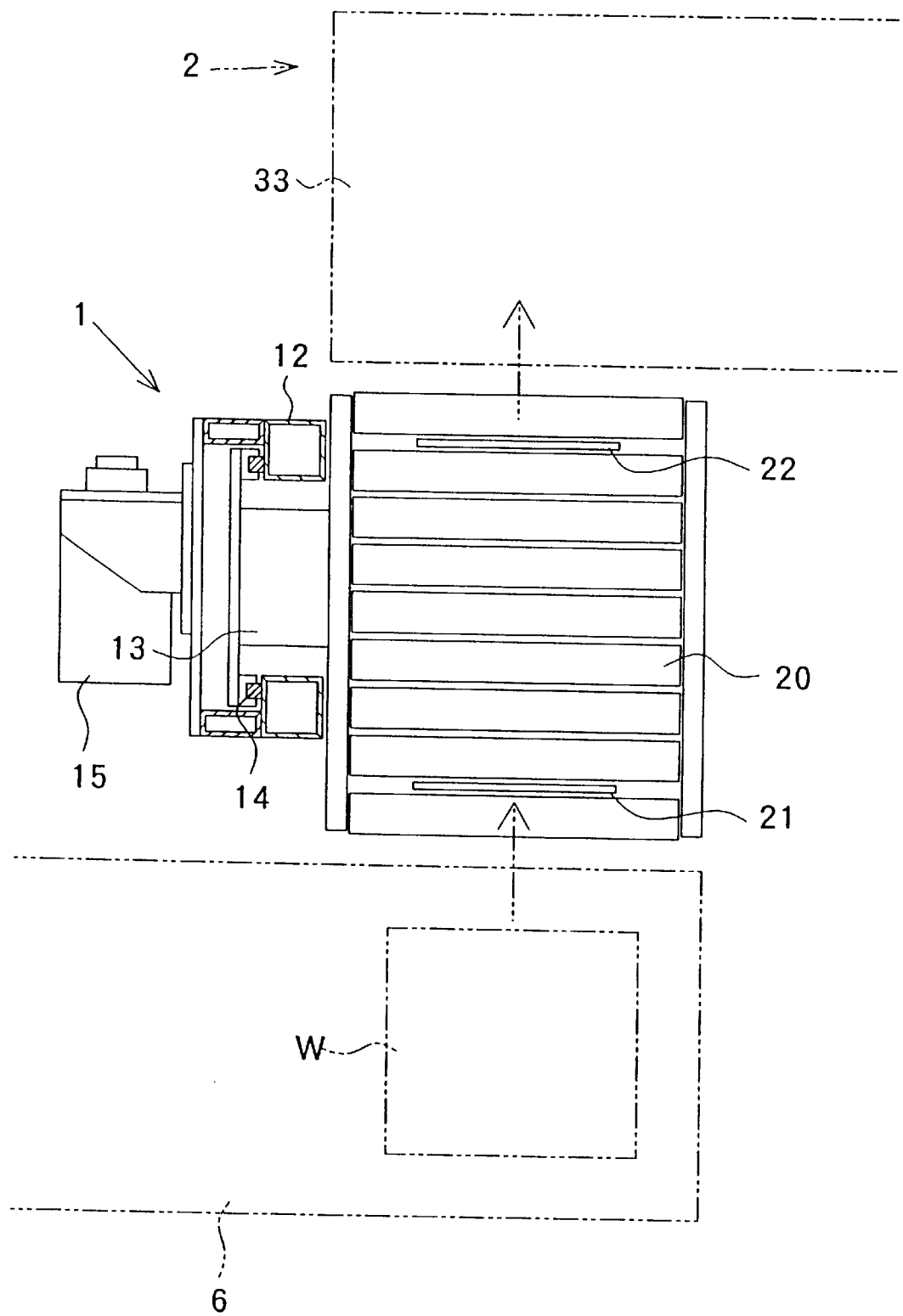
FIG. 3 is a cross-sectional view of the lifting mechanism taken on line A—A of FIG. 2.

FIGS. 2 and 3 depict the structure of the lifting mechanism 1 in further detail. Referring to FIG. 2, the lifting mechanism 1 has a lift mast 12 erected on a base 11. A carriage 13 is supported on the lift mast 12 via a pair of rails 14 in such a manner that the carriage 13 can travel along the rails 14. Provided at the lower end of the lift mast 12 is a motor 15 connected to the carriage 13 via a belt 16, a reduction gear 17, a belt 18, and a chain 19. The motor 15 is placed under the control of the control unit 4 for vertically moving the carriage 13 along the rails 14 to a desired position.

Referring now to FIG. 3, provided on top of the carriage 13 are a roller conveyer 20 and a pair of stoppers 21 and 22 (which constitute a vertical transfer mechanism). The roller conveyer 20 includes as its power source a motor (not shown) the operation of which is also controlled by the control unit 4. The stoppers 21 and 22, which normally stay below the upper surface of the conveyer 20, can be raised above the upper surface by an pneumatic cylinder 23 which is also under control of the control unit 4.

In operation, loads W are delivered by the external conveyer 6 to the lifting mechanism 1 from a warehouse or other storage space. It should be noted that more than one external conveyer 6 can be provided to facilitate stacking. When a plurality of conveyers 6 are employed, they are installed in tiers. At its terminus, the external conveyer 6 transfers loads W to the roller conveyer 20 one at a time. By the time the external conveyer 6 transfers a load to the roller conveyer 20, the carriage 13 has vertically moved the roller conveyer 20 to the same level as the external conveyer 6 in operation according to the instruction of the control unit 4.

The roller conveyer 20 receives a load W with the receiving side stopper 21 down (allowing passage) and the delivering side stopper 22 up (preventing passage). The conveyer 20 stops its rollers immediately before load W reaches the stopper 22 and raises the stopper 21. The carriage 13 then moves upward or downward so that the roller conveyer 20 locates load W in the position corresponding to the stacking level. The stoppers 21 and 22 prevent load W from falling from the roller conveyer 20 during transfer. Once the carriage 13 stops, the roller conveyer 20 lowers the stopper 22 and drives the rollers to transfer load W to the stacking mechanism 2.

FIGS. 4 to 7 shows the stacking mechanism 2 in further detail. With specific reference to FIGS. 4 and 5, the stacking mechanism 2 has a lift mast 27 erected on a base 26. A carriage 28 is supported on the lift mast 27 via a pair of rails 29 in such a manner that the carriage 28 can travel along the rails 29. Provided on the base 26 is a motor 30 connected to the carriage 28 via a belt 31 and a chain 32. The motor 30 is placed under the control of the control unit 4 for vertically moving the carriage 28 along the rails 29 to a desired position.

Figure 7:
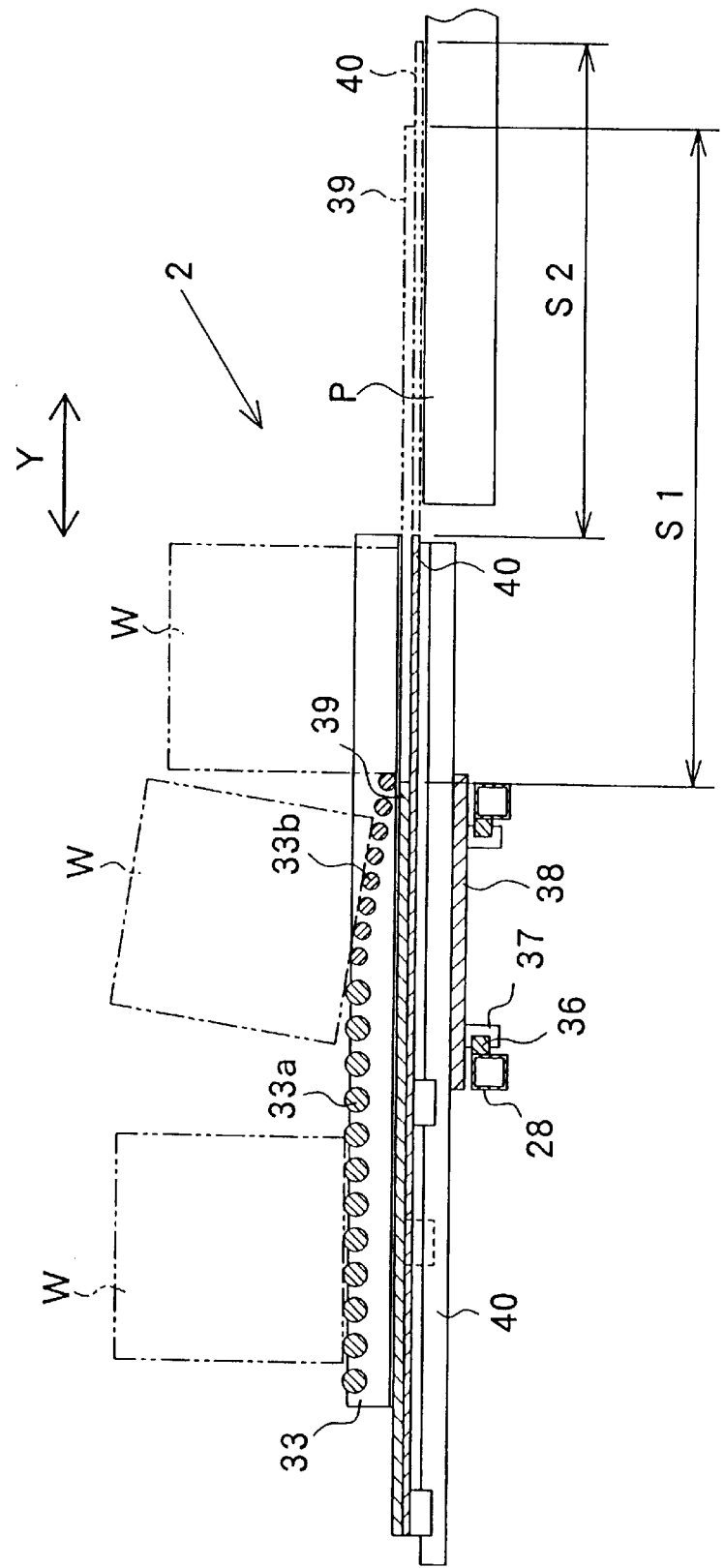
FIG. 7 shows a horizontal transfer mechanism and stacking means of the stacking mechanism of the palletizer of FIG. 1.

Provided in the lower part of the carriage 28 is a roller conveyer 33 (which constitutes a horizontal transfer mechanism) including a horizontal section 33a and a ramp 33b. Referring now to FIG. 7, the roller conveyer 33 places on the horizontal section 33a the load W received from the roller conveyer 20 of the lifting mechanism 1 and transfers the load W, by rotation of the rollers, toward pallet P in the approximately horizontal direction indicated by arrow Y. Upon reaching the ramp 33b, load W slides down by its own weight to a position before pallet P. Furthermore, the roller conveyer 33 has a plurality of stoppers 34 that are movable between upper and lower positions for delivering loads W separately (see FIGS. 10 and 11). The stoppers 34 are positioned above the upper surface of the conveyer 33 in the upper positions and positioned below the upper surface in the lower position. A pneumatic cylinder and a motor (neither shown) drive the stoppers 34 and the roller conveyers 33, respectively, under the control of the control unit 4.

Figure 6:
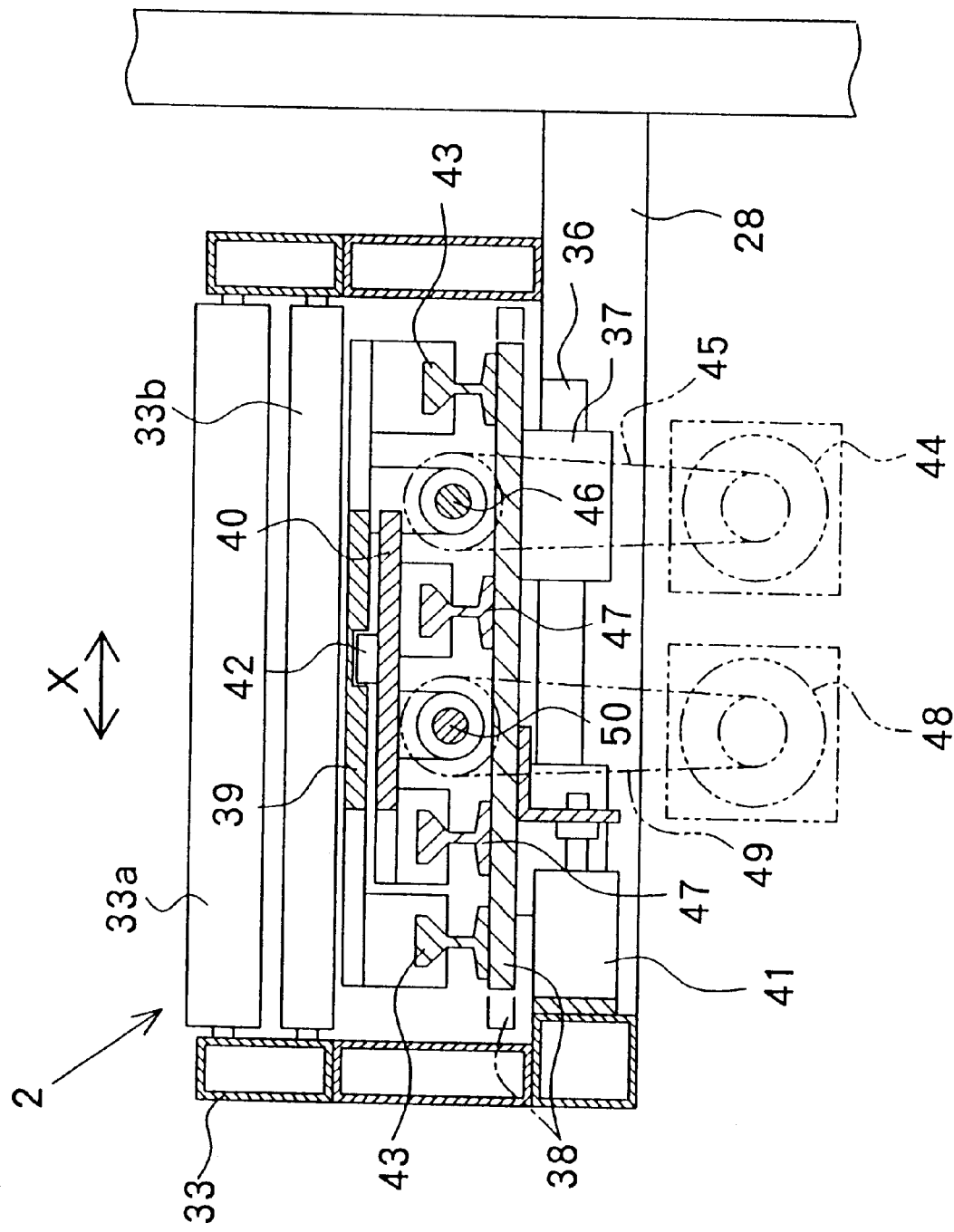
FIG. 6 is a cross-sectional view of the stacking mechanism taken on line B—B of FIG. 4.

As shown in FIGS. 6 and 7, a pair of rails 36 are provided under the roller conveyer 33 inside the carriage 28. The rails 36 extend in a direction X, which is orthogonal to the direction of transferring loads W. A support plate 38 is slidably supported on the rails 36 via sliders 37. The support plate 38 supports upper and lower plates 39 and 40 for stacking loads W on pallet P. The carriage 28 further includes an pneumatic cylinder 41 for driving the support plate 38 to adjust the positions of the upper and lower plates 39 and 40 in direction X. By this positioning adjustment, proper clearance is created to prevent collision between load W to be stacked and the adjacent loads already stacked on pallet P.

Figure 12:
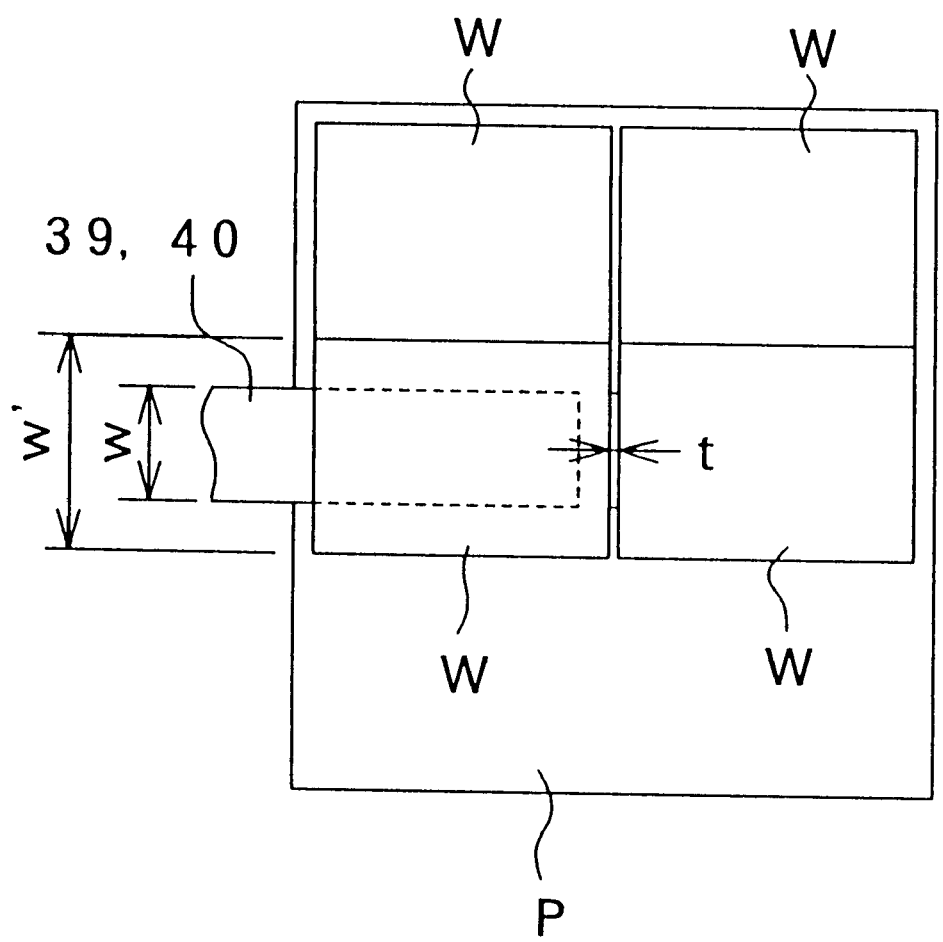
FIG. 12 shows how the stacking means arranges loads with small clearances on the pallet.

As shown in FIG. 12, the upper and lower plates 39 and 40 are elongated plates with the same width having a plurality of rollers 42 (only one shown in FIG. 6) interposed therebetween. The upper plate 39 is supported on the support plate 38 via a pair of rails 43 so as to allow the upper plate 39 to slide in direction Y. A motor 44 is provided below the sliders 37 to drive the upper plate 39 via a belt 45 and a ball screw 46. The lower plate 40 is supported on the support plate 38 via a pair of rails 47 so as to allow the lower plate 40 to slide in direction Y. A motor 48 is provided below the sliders 37 to drive the lower plate 40 via a belt 49 and a ball screw 50. The motors 44 and 48 are both controlled by the control unit 4. It should be noted that the ball screws 46 and 50 may be replaced with chains, timing belts, or other power transmission devices.

Figure 4:
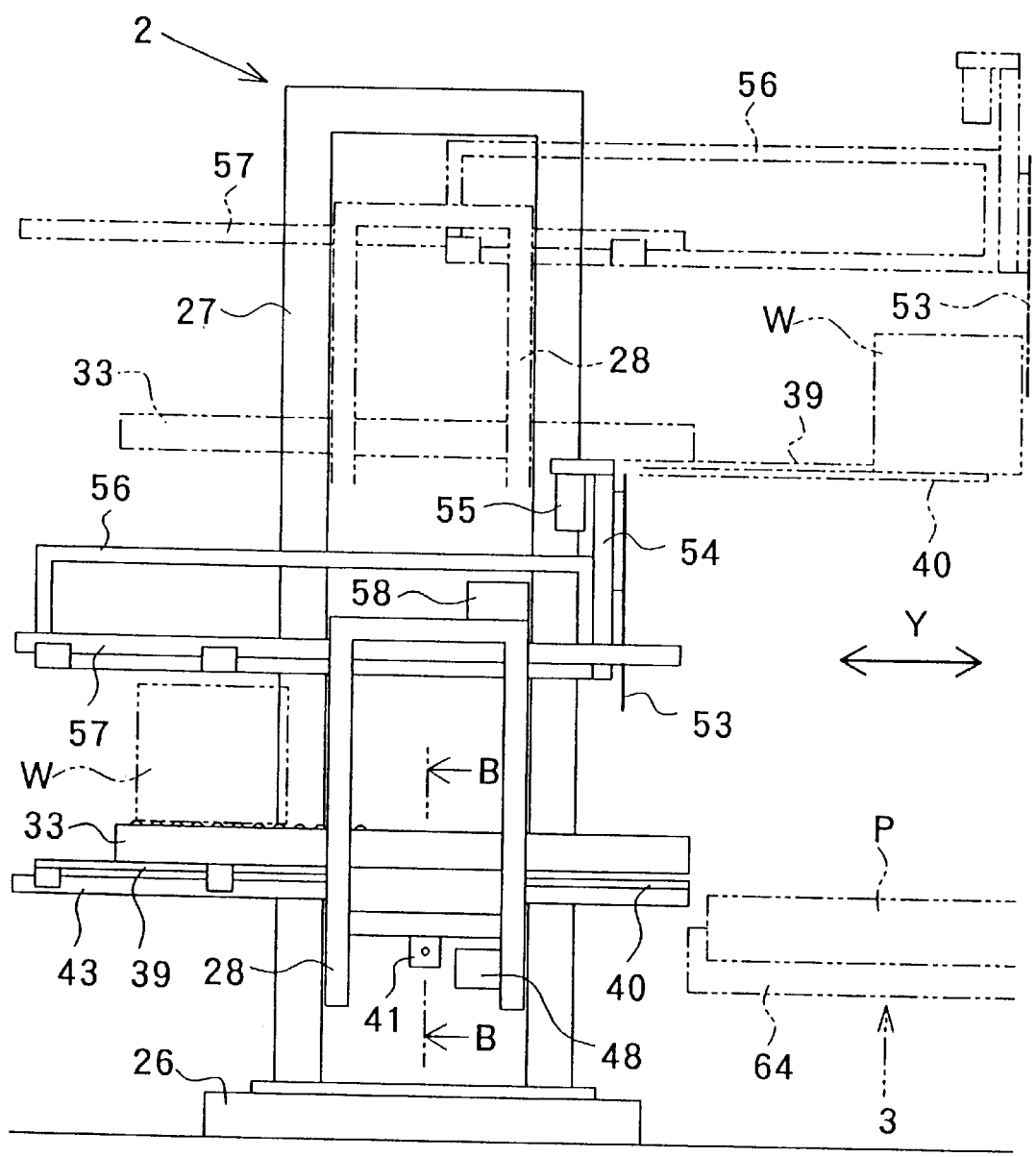
FIG. 4 is a front elevation view of the stacking mechanism of the palletizer of FIG. 1.
Figure 5:
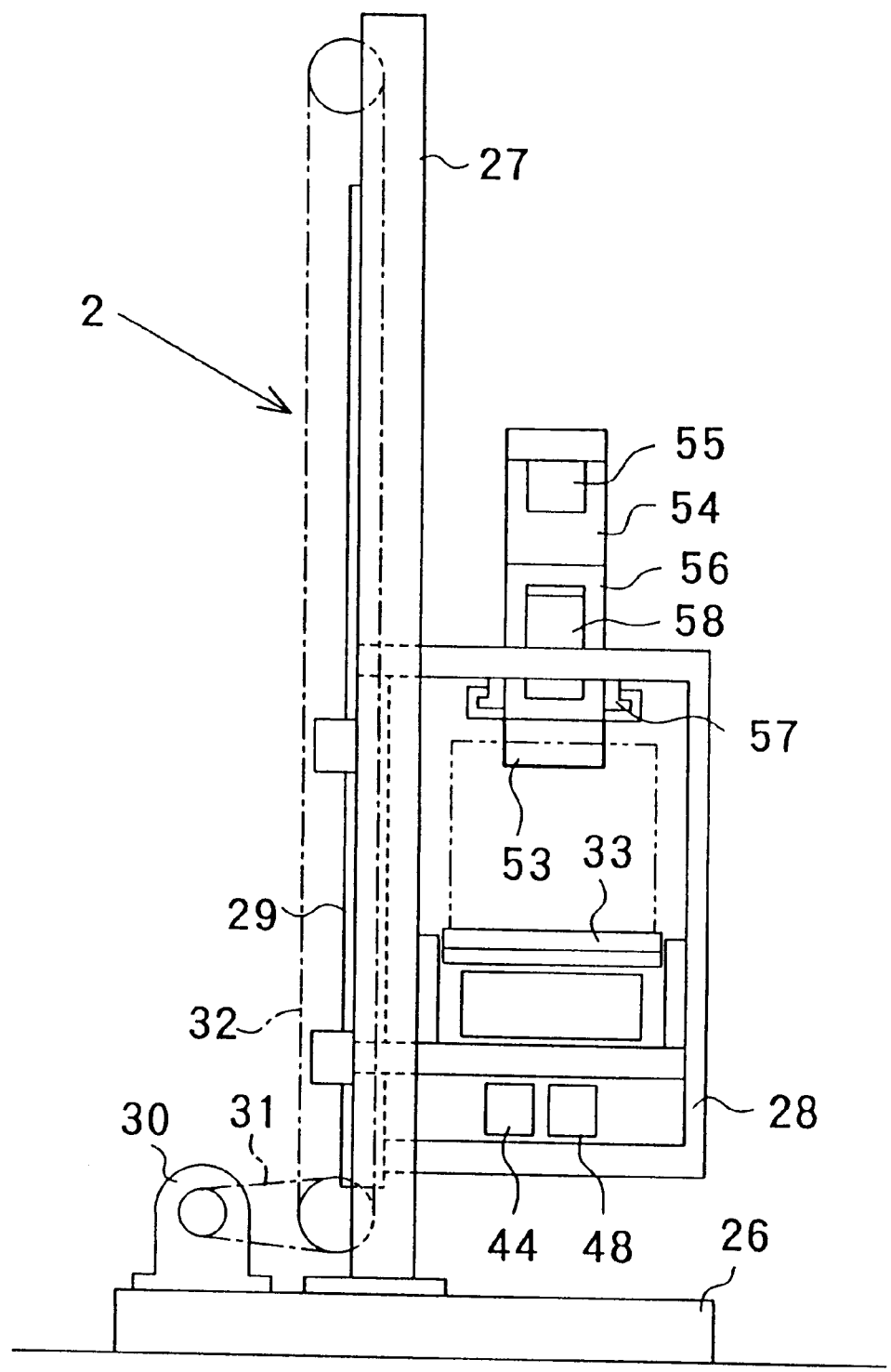
FIG. 5 is a left side elevation view of the stacking mechanism of FIG. 4.

As shown in FIG. 4, an abutment plate 53 is disposed at the top of the carriage 28, which together with the upper and lower plates 39 and 40 constitutes a stacking means. The abutment plate 53 is slidably supported on a guide member 54 and vertically driven by a motor 55 via a ball screw, a chain, or other power transmission device (not shown). The guide member 54 is secured to the front end of a ram 56 which is in turn slidably supported on the upper end of the carriage 28 via a pair of rails 57. Thus constructed, the ram 56 is moved in direction Y on a horizontal plane by a motor 58 via a ball screw, chain, or other power transmission device (not shown). The motors 55 and 58 are both controlled by the control unit 4 so that load W can be maintained upright between the abutment plate 53 and the upper plate 39 while the load is being stacked.

Still referring to FIG. 4, the carriage 28, which functions as a vertical positioning mechanism, determines the vertical positions of the roller conveyer 33, the upper and lower plates 39 and 40, and the abutment plate 53 corresponding to the stacking level of load W. At the stacking level of load W, the roller conveyer 33 places load W onto the lower plate 40 so that the upper plate 39 and the abutment plate 53 can hold load W therebetween. The upper plate 39 then pushes load W across the lower plate 40 until load W reaches the point directly over the stacking position on pallet P. Thereupon, the lower plate 40 is withdrawn from under load W to stack the load on pallet P. In FIG. 7, S1 indicates the extension of the upper plate 39 while S2 indicates the extension of the lower plate 40.

Figure 8:
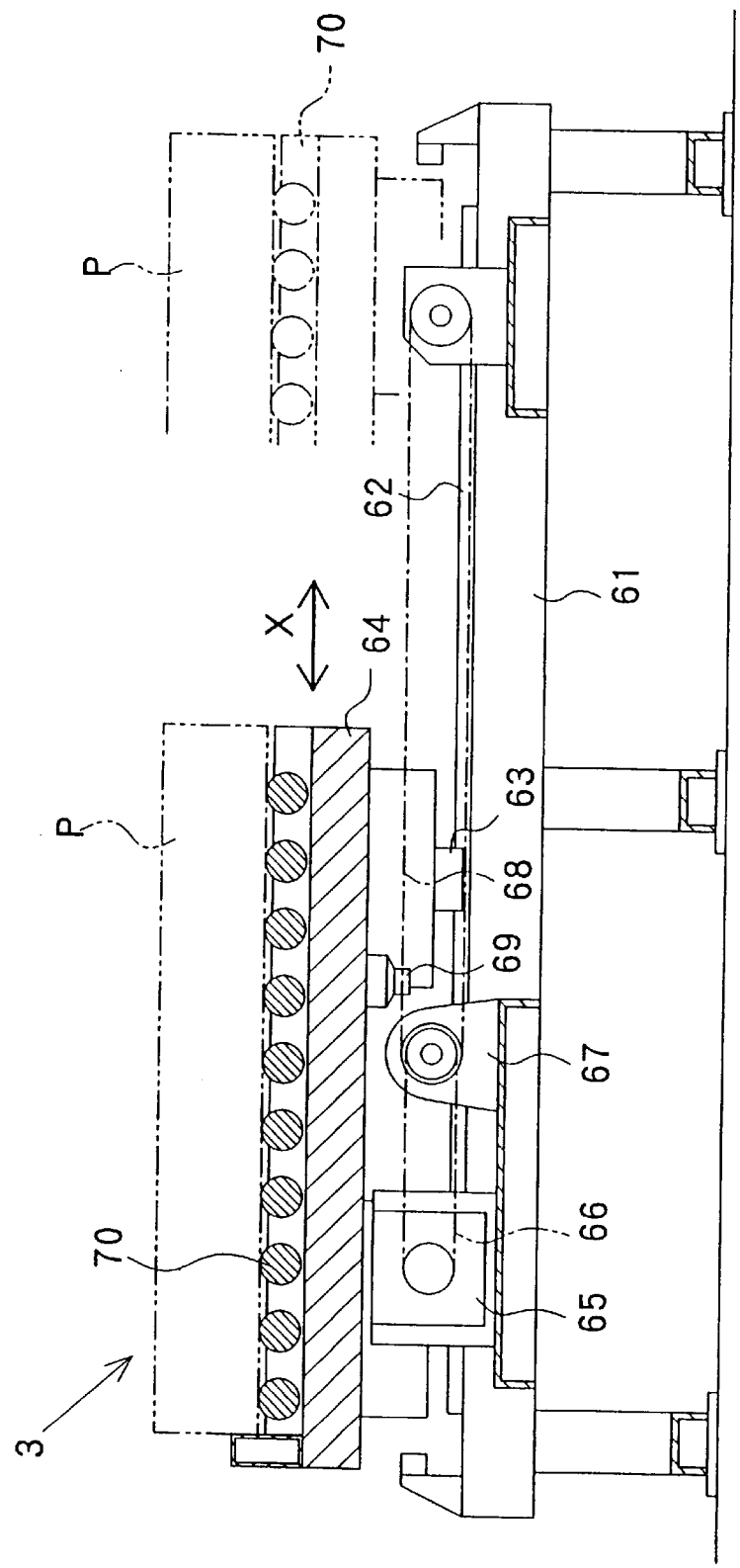
FIG. 8 is a cross-sectional view of a table of the palletizer of FIG. 1.

FIG. 8 is an elevation view of the moving table assembly 3, in which a frame 61 extends in direction X, which is orthogonal to the direction of the travel of load W. Laid along the frame 61 are a pair of rails 62 upon which a table 64 is slidably disposed via sliders 63. A roller conveyer 70 on which pallet P is placed is secured to the upper surface of the table 64. The table 64 is driven by a motor 65 via a belt 66, a speed change gear 67, a chain 68, and a coupler 69. The motor 65 is also controlled by the control unit 4. The table 64 functions as a horizontal positioning means that positions pallet P in direction X on a horizontal plane at the stacking level. The roller conveyer 70 is a self-driven type provided with its own motor (not shown) so that the conveyer can automatically carry away pallet P when it is fully stacked with loads.

Figure 9:
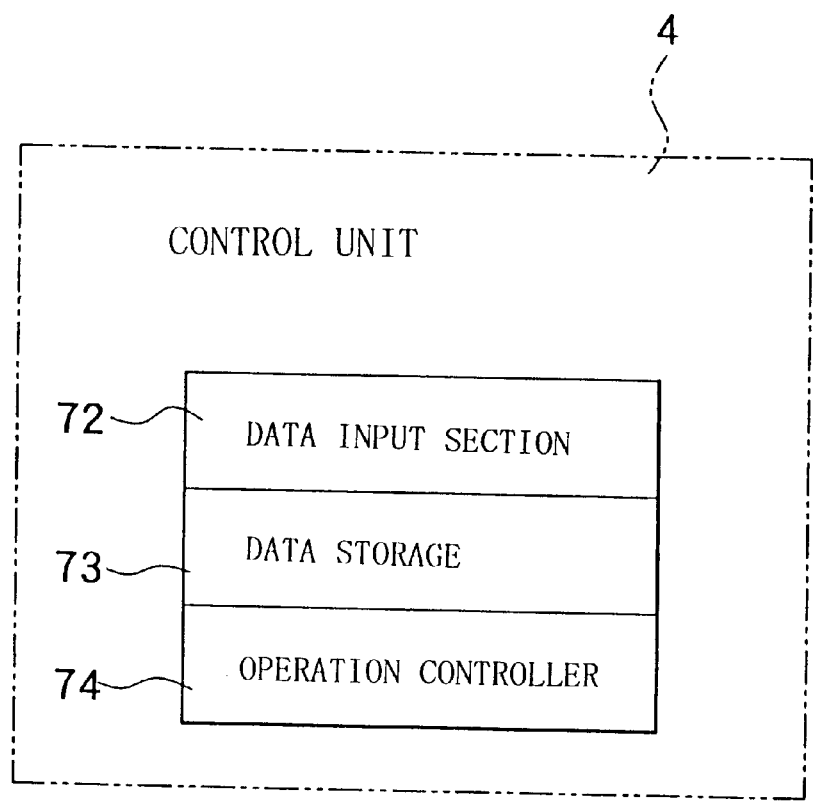
FIG. 9 is a block diagram for a control unit of the palletizer of FIG. 1.

Referring to FIG. 9, the control unit 4 includes a data input section 72, a data storage 73, and an operation controller 74 to control the synchronized operation of the aforementioned drive units of the palletizer. The data input section 72 receives from an external computer various data, including stacking plan information (the type, quantity, posture, and position of load W), a part program including a position/speed control program required to operate the palletizer, and stacking standard data which includes the dimensions and weight of load W. The data storage 73 stores the above data in a manner such that it can be readily accessible for use. The operation controller 74, among other tasks, carries out the commands given through the control panel 5, generates instructions to be executed by the part program based on the stacking plan information and the stacking standard data, and controls the operation of the aforementioned drive units.

Figure 10A:
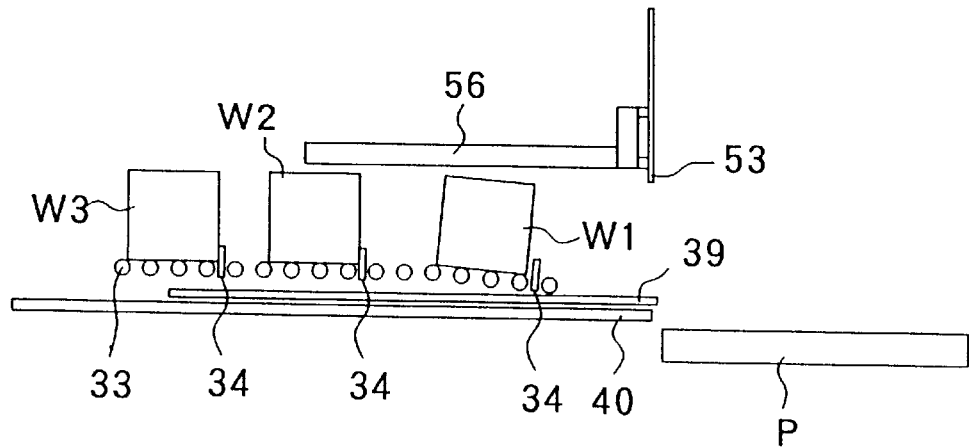
FIGS. 10A–10C and FIGS. 11A–11C show how the palletizer of the embodiment continuously stacks loads on a pallet.
Figure 10B:
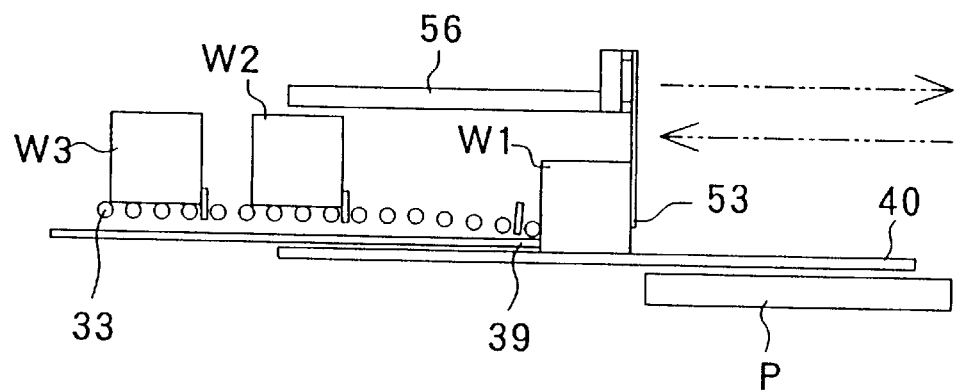
Figure 10C:
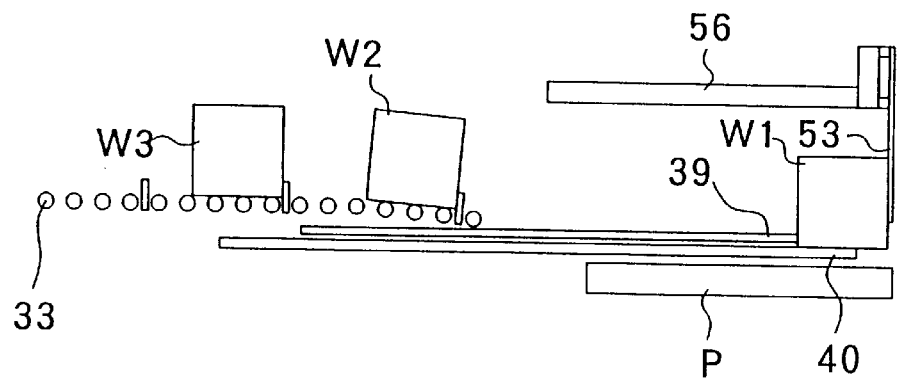

The method of stacking loads W with the palletizer is explained hereinafter with specific reference to FIGS. 10A to 10C and 11A to 11C. Loads W that have been delivered by the external conveyer 6 are moved to the stacking level by the roller conveyer 20 of the lifting mechanism 1. Next, as shown in FIG. 10A, three loads W1, W2, and W3, for example, are placed on the roller conveyer 33 of the stacking mechanism 2 while separated by the stoppers 34. Third, as shown in FIG. 10B, as soon as the first load W1 is transferred from the roller conveyer 33 to the upper plate 39 in front of pallet P, the upper plate 39 is pulled out from under load W1, thus placing it on the lower plate 40. In the meantime, the ram 56 advances and stops beyond load W1. Then, after the abutment plate 53 descends, the ram 56 retracts to wedge load W1 between the abutment plate 53 and the upper plate 39. As the next step, the upper plate 40 advances to apoint over the stacking position. Next, while sandwiching load W1, the abutment plate 53 and the upper plate 39 move forward in the same direction at the same speed in synchronism as shown in FIG. 10C. Consequently, load W1 is partly pushed out of the lower plate 40 by the upper plate 39, where it is located above the precise stacking position.

Figure 11A:
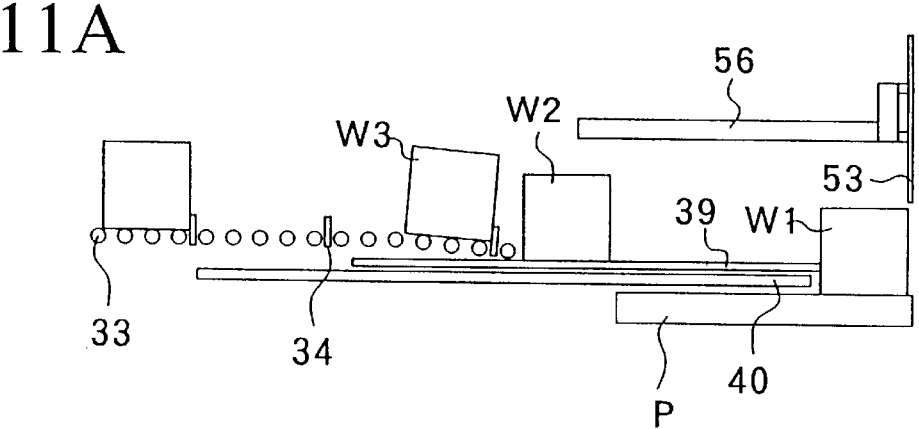
Figure 11B:
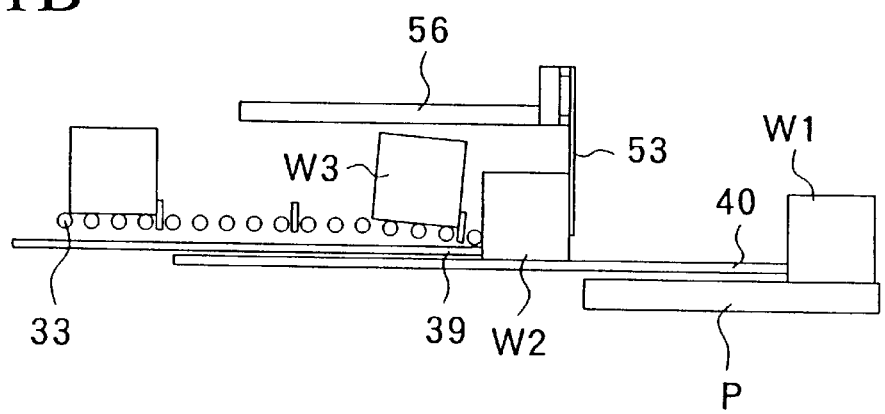
Figure 11C:
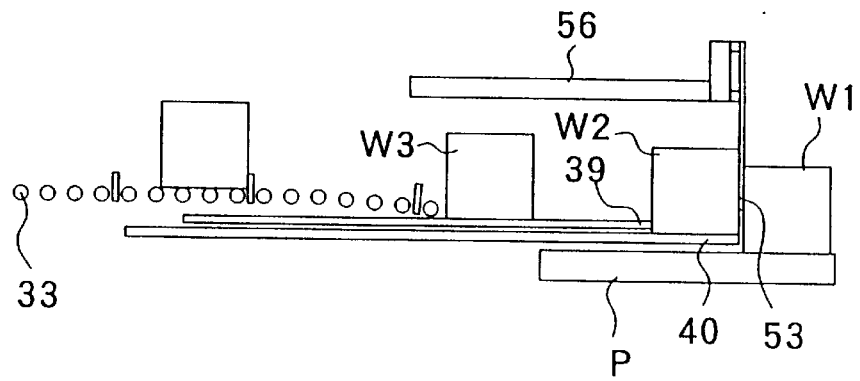

Referring now to FIG. 11A, at the next step, the lower plate 40 is withdrawn from under load W1, by retracting a distance corresponding to the dimension of load W1. As a result, load W1 drops down on pallet P while being guided by the abutment plate 53. During the stacking of load W1, the second load W2 is transferred to the upper plate 39 and upon completion of the stacking of load W1, the abutment plate 53 is raised to clear load W1. Then, as shown in FIG. 11B, the upper plate 39 is again withdrawn to place load W2 on the lower plate 40. Meanwhile the ram 56 moves backward with the abutment plate 53 lowered, wedging load W2 between the abutment plate 53 and the upper plate 39. While holding load W1, the abutment plate 53 and the upper plate 39 move forward in the same direction at the same speed in synchronism. Again, as shown in FIG. 11C, load W2 is pushed on the lower plate 40 by the upper plate 39 to the point where it is located directly over the next stacking position in front of load W1.

In the same manner as with load W1, the lower plate 40 is withdrawn from under load W2 to stack it on pallet P load adjacent to W1. When the third load W3 is stacked in the same manner, the first row of pallet P is fully stacked. The table 64 moves pallet P in direction X to align the second row with the stacking means. When all the rows are stacked, the carriage 13 of the lifting mechanism 1 and the carriage 28 of the stacking mechanism 2 are moved to the second stacking level, whereupon the above-described stacking procedure is repeated to stack numerous loads W in tiers on pallets P. It should be noted that as shown in FIG. 12, both upper and lower plates 39 and 40 are made narrower than load W (w<w') and the abutment plate 53 is made of a very thin material (e.g. 6 mm) allowing a number of loads to be stacked on pallet P with a very small clearancet between adjacent loads.

Figure 13A:
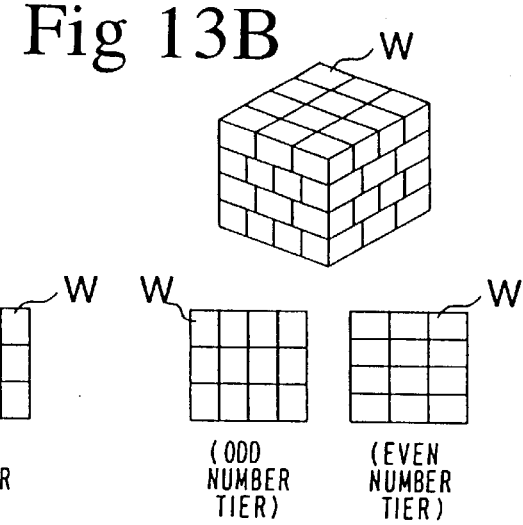
Figure 13C:
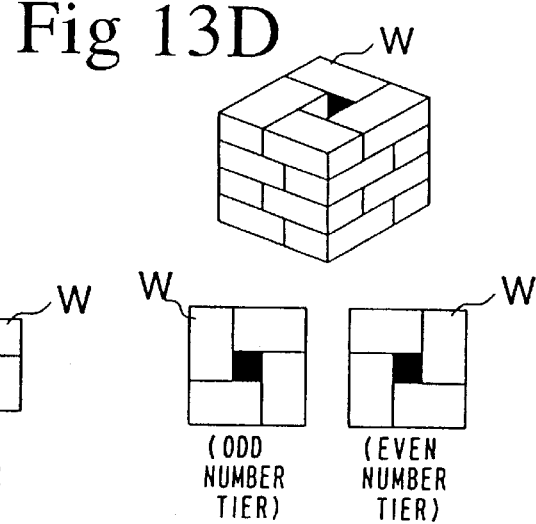
Figure 13E:
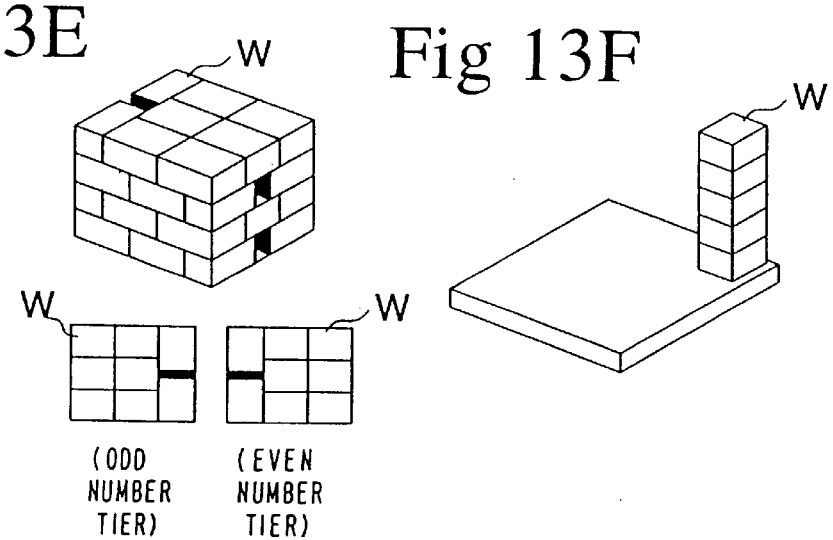
Figure 14:
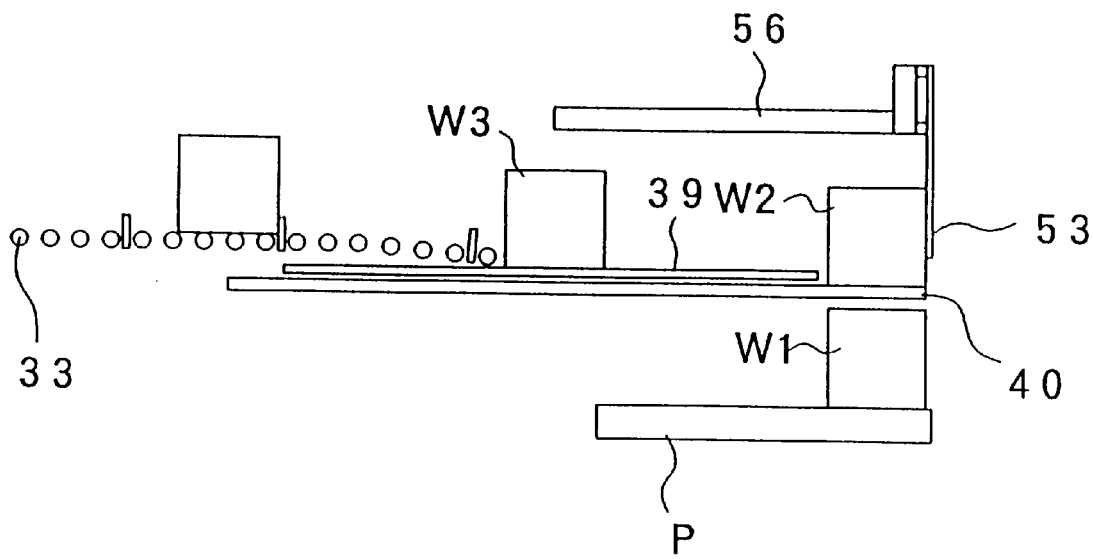
FIG. 14 shows how the stacking means stacks loads on a pallet in the pattern of FIG. 13F.

FIGS. 13A–13F show different stack patterns that can be executed by the palletizer of this embodiment. With the above described stacking method, the interlocking stack patterns shown in FIGS. 13A–13E are possible. The stack pattern of FIG. 13F is also possible if, following the above-described stacking of load W1, the lower plate 40 is raised to higher levels to stack load W2 on top of load W1, load W3 on top of load W2, load W4 on top of load W3, and so forth as shown in FIG. 14.

Figure 15:
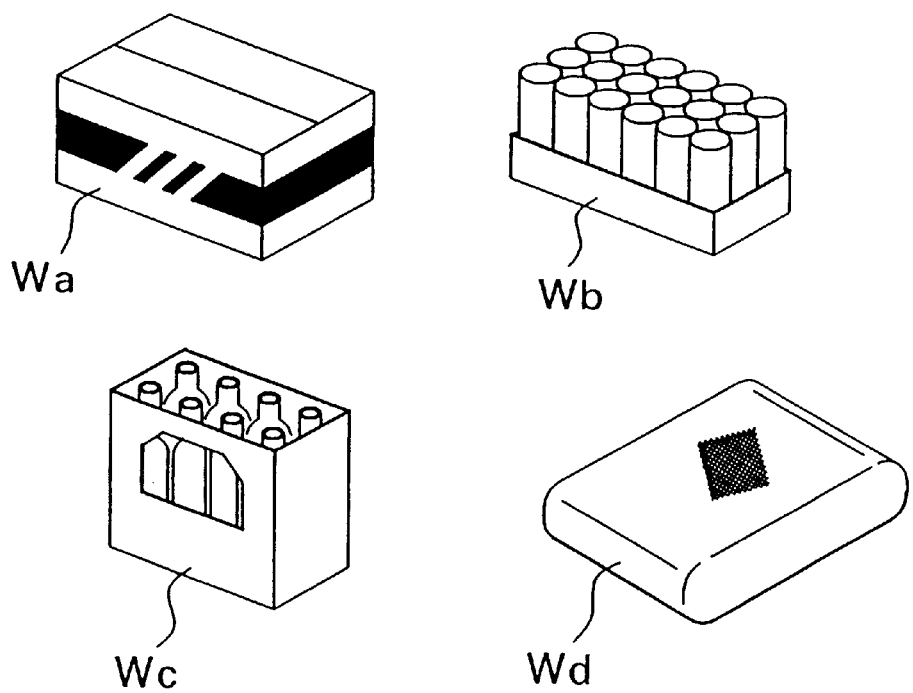
FIG. 15 shows in perspective examples of loads that can be handled by the palletizer of FIG. 1.

FIG. 15 shows some of the types of loads that can be stacked by the palletizer. Load Wa is a closed corrugated cardboard carton containing various items. Load Wb is a corrugated cardboard tray holding cans or canisters. If necessary, the entire load can be wrapped up in a resin film. Load Wc is a plastic case with an open top holding bottles. Load Wd is a bag containing various items.

According to the above-described palletizer, each load W is handled while supported at the bottom surface throughout the stacking process. Unlike the above-explained conventional method by which loads are gripped by a manipulator or the like, no manual or automatic readjustment, such as replacement of the manipulator, is required when the type or size of loads W is changed. Therefore, differently shaped loads can be continuously and automatically stacked without interruption.

Figure 16:
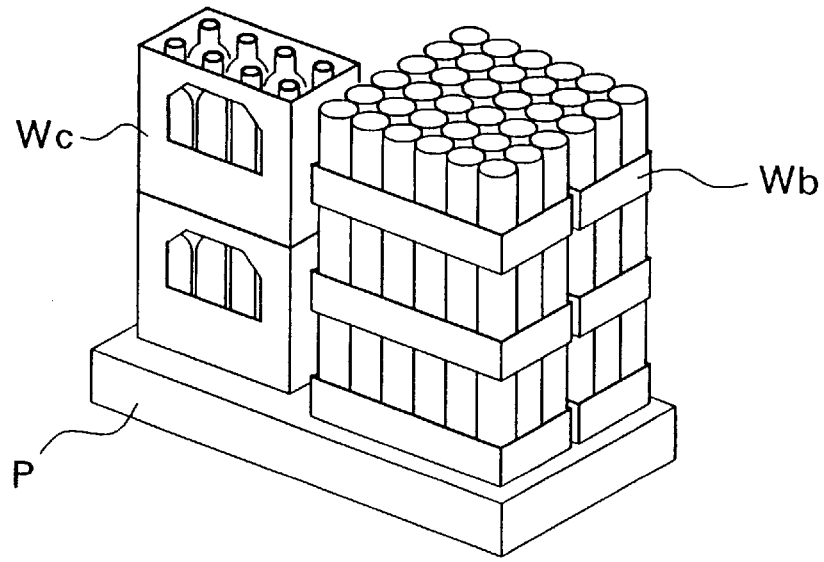
FIG. 16 shows different types of loads stacked on a flat pallet.
Figure 17:
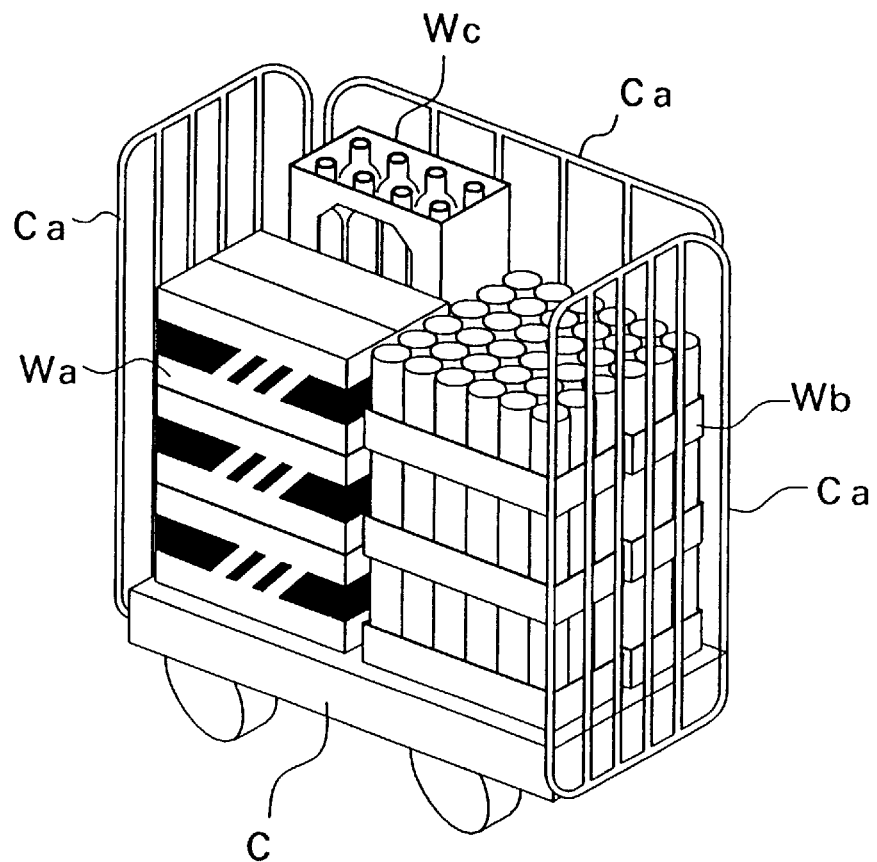
FIG. 17 shows different types of loads stacked together on a cart with walls on three sides.
Figure 18:
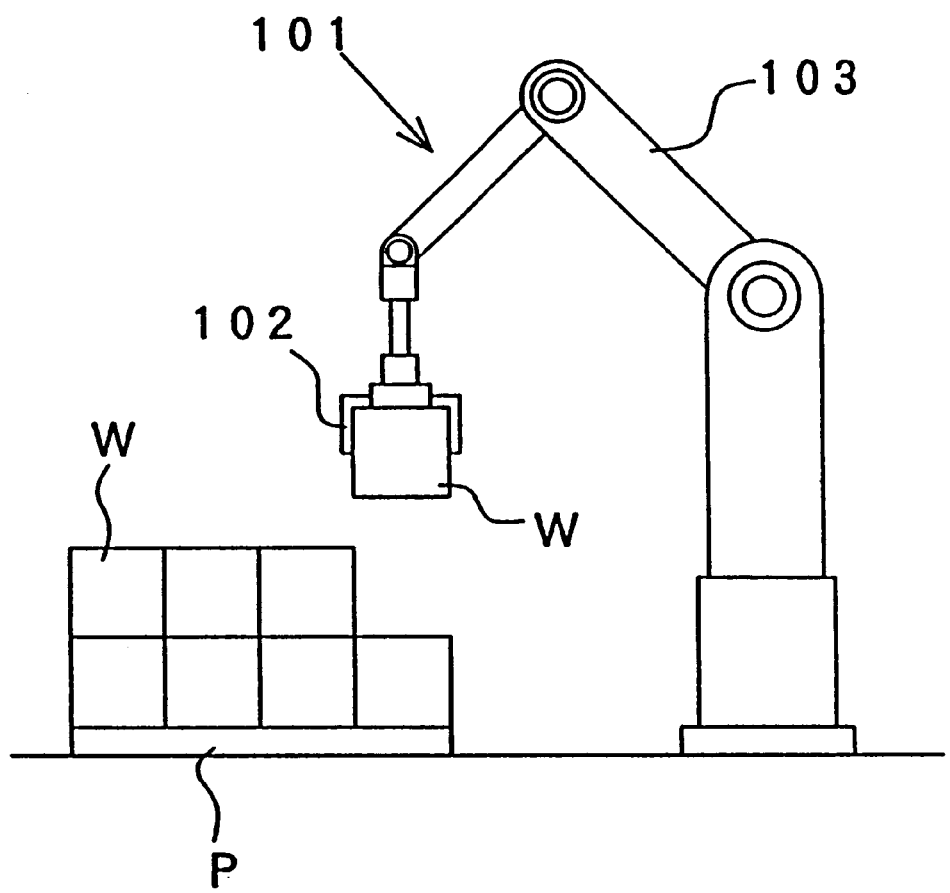
FIG. 18 is a side elevation view of a known articulated robot palletizer in operation.

FIGS. 16 and 17 depict examples of different types of loads stacked by the palletizer of the embodiment. In FIG. 16, loads Wb and Wc are stacked on the same pallet. FIG. 17 shows loads Wa, Wb, and Wc stacked together on a cart C with vertical walls Ca on three sides. According to the palletizer, none of the elements that engage loads, i.e., the upper and lower plates 39 and 40 and abutment plate 53, interferes with the cart C, with walls Ca in particular, such that minimum wasted space is created along the vertical walls Ca on cart C. Loads are thus stacked at a higher efficiency than with the conventional palletizer.

As explained above in detail, the palletizer according to the invention offers the advantage of continuously and automatically stacking loads in different shapes without any inconvenient adjustments. The palletizer of the invention offers the further advantage of stacking loads with greater efficiency without creating dead space on carts.

As any number of further modifications, alterations, and changes are possible without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A stacking apparatus for sequentially stacking loads on a platform in tiers, the apparatus comprising:
    (a) a vertical transfer means for vertically transferring an externally provided load according to a stacking level;
    (b) a horizontal transfer means for receiving the load from the vertical transfer means and approximately horizontally transferring the load to a point close to the platform;
    (c) a stacking means for receiving the load from the horizontal transfer means and horizontally transferring the load to the point directly over a stacking position on the platform and placing the load in the stacking position, wherein said stacking means includes:
        a lower plate disposed below the horizontal transfer means for being transferred horizontally to the point over the stacking position with the load carried thereon;
        an upper plate disposed between the lower plate and the horizontal transfer means for pushing the load on the lower plate to the point directly over the stacking position; and
        an abutment plate for interposing the load between the abutment plate the upper plate, wherein the lower plate is pulled out from under the load at the point directly over the stacking position so as to place the load in the stacking position on the platform;
    (d) a vertical positioning means for vertically positioning the horizontal transfer means and the stacking means corresponding to the stacking level;
    (e) a horizontal positioning means for positioning the platform on a horizontal plane in a direction orthogonal to the direction in which the stacking means transfers the load to the point directly over the stacking position; and
    (f) a control means for controlling the operation of the vertical transfer means, the horizontal transfer means, the stacking means, the vertical positioning means and the horizontal positioning means in synchronism.

2. A stacking apparatus in accordance with claim 1, wherein the upper plate is disposed horizontally such that an edge of the upper plate abuts on the load when the load is interposed between the upper plate and the abutment plate, whereas the abutment plate is disposed substantially vertically such that the load abuts on a side surface of the abutment plate on an upper plate side when interposed between the upper plate and the abutment plate.

3. A stacking apparatus in accordance with claim 2, wherein the abutment plate is vertically movable between upper and lower positions such that, in the lower position, the abutment plate can engage the load to interpose the load between the upper plate and the side surface of the abutment plate, whereas in the upper position, the abutment plate is disengaged from and clears the load.

4. A stacking apparatus in accordance with claim 3, wherein the side surface on which the load abuts functions as a load guide while the load is being placed on the platform so as to allow the load to be accurately placed in the stacking position.

5. A stacking apparatus in accordance with claim 4, wherein the abutment plate is movable at the same speed in the same horizontal direction as the upper plate.

6. A stacking apparatus in accordance with claim 2, wherein the thickness of the abutment plate is significantly less than a depth of the load, such that when a plurality of loads are stacked on the platform, only a small clearance is left between adjacent loads, thus efficiently using the surface of the platform on which the load is placed.

7. A stacking plate in accordance with claim 2, wherein the thickness of each of the upper and lower plates is significantly less than a height of the load, such that the load is gently placed on the platform when the lower plate is pulled out from under the load.

8. A stacking apparatus in accordance with claim 3, wherein the thickness of the abutment plate is significantly less than a depth of the load, such that when a plurality of loads are stacked on the platform, only a small clearance is left between adjacent loads, thus efficiently using the surface of the platform on which the load is placed.

9. A stacking plate in accordance with claim 3, wherein the thickness of each of the upper and lower plates is significantly less than a height of the load, such that the load is gently placed on the platform when the lower plate is pulled out from under the load.

10. A stacking apparatus in accordance with claim 4, wherein the thickness of the abutment plate is significantly less than a depth of the load, such that when a plurality of loads are stacked on the platform, only a small clearance is left between adjacent loads, thus efficiently using the surface of the platform on which the load is placed.

11. A stacking plate in accordance with claim 4, wherein the thickness of each of the upper and lower plates is significantly less than a height of the load, such that the load is gently placed on the platform when the lower plate is pulled out from under the load.

12. A stacking apparatus in accordance with claim 5, wherein the thickness of the abutment plate is significantly less than a depth of the load, such that when a plurality of loads are stacked on the platform, only a small clearance is left between adjacent loads, thus efficiently using the surface of the platform on which the load is placed.

13. A stacking plate in accordance with claim 5, wherein the thickness of each of the upper and lower plates is significantly less than a height of the load, such that the load is gently placed on the platform when the lower plate is pulled out from under the load.

14. A stacking apparatus in accordance with claim 1, wherein the thickness of the abutment plate is significantly less than a depth of the load, such that when a plurality of loads are stacked on the platform, only a small clearance is left between adjacent loads, thus efficiently using the surface of the platform on which the load is placed.

15. A stacking apparatus in accordance with claim 14, wherein the abutment plate has a thickness of about 6 mm.

16. A stacking apparatus in accordance with claim 1, wherein the thickness of each of the upper and lower plates is significantly less than a height of the load, such that the load is gently placed on the platform when the lower plate is pulled out from under the load.

17. A stacking apparatus in accordance with claim 1, wherein the upper and lower plates are both narrower than the load to be stacked on the platform, such that a plurality of loads can be stacked with a minimum clearance therebetween and that neither the upper nor the lower plate interferes with adjacent loads that have been already stacked.

18. A stacking apparatus for sequentially stacking loads on a platform in tiers, the apparatus comprising:
(a) a vertical transfer means for vertically transferring an externally provided load according to a stacking level, wherein said vertical transfer means includes:
a vertically movable roller conveyer for receiving the load at a first end thereof and sending off the load at a second end thereof;
a drive unit for lifting and lowering the roller conveyer; and
a pair of stoppers provided adjacent to the first and second ends, said stoppers being able to rise above the upper surface of the roller conveyer to prevent the load from falling from the conveyer while the roller conveyer is in operation;
(b) a horizontal transfer means for receiving the load from the vertical transfer means and approximately horizontally transferring the load to a point close to the platform;
(c) a stacking means for receiving the load from the horizontal transfer means and horizontally transferring the load to the point directly over a stacking position on the platform and placing the load in the stacking position;
(d) a vertical positioning means for vertically positioning the horizontal transfer means and the stacking means corresponding to the stacking level;
(e) a horizontal positioning means for positioning the platform on a horizontal plane in a direction orthogonal to the direction in which the stacking means transfers the load to the point directly over the stacking position; and
(f) a control means for controlling the operation of the vertical transfer means, the horizontal transfer means, the stacking means, the vertical positioning means and the horizontal positioning means in synchronism.

19. A stacking apparatus for sequentially stacking loads on a platform in tiers, the apparatus comprising:
(a) a vertical transfer means for vertically transferring an externally provided load according to a stacking level;
(b) a horizontal transfer means for receiving the load from the vertical transfer means and approximately horizontally transferring the load to a point close to the platform, wherein the horizontal transfer means includes a roller conveyer for carrying the load thereon, the roller conveyer having a horizontal section and a ramp for bringing the load from the horizontal section down to the stacking mean;
(c) a stacking means for receiving the load from the horizontal transfer means and horizontally transferring the load to the point directly over a stacking position on the platform and placing the load in the stacking position;
(d) a vertical positioning means for vertically positioning the horizontal transfer means and the stacking means corresponding to the stacking level;
(e) a horizontal positioning means for positioning the platform on a horizontal plane in a direction orthogonal to the direction in which the stacking means transfers the load to the point directly over the stacking position; and
(f) a control means for controlling the operation of the vertical transfer means, the horizontal transfer means, the stacking means, the vertical positioning means and the horizontal positioning means in synchronism.

20. A stacking apparatus in accordance with claim 19, wherein the horizontal transfer means further comprises a plurality of stoppers adapted for being raised above the upper surface of the roller conveyer for separating a plurality of loads on the roller conveyer.

* * * * *